(12) United States Patent
Aguera y Arcas

(10) Patent No.: US 7,224,361 B2
(45) Date of Patent: May 29, 2007

(54) SYSTEM AND METHOD FOR MULTIPLE NODE DISPLAY

(75) Inventor: Blaise Aguera y Arcas, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 11/110,497

(22) Filed: Apr. 20, 2005

(65) Prior Publication Data

US 2005/0184989 A1    Aug. 25, 2005

Related U.S. Application Data

(63) Continuation of application No. 10/854,117, filed on May 26, 2004, now Pat. No. 7,042,455.

(60) Provisional application No. 60/474,313, filed on May 30, 2003.

(51) Int. Cl.
*G06T 17/00* (2006.01)

(52) U.S. Cl. ..................................... 345/428

(58) Field of Classification Search ..................... None
See application file for complete search history.

(56) References Cited

U.S. PATENT DOCUMENTS

| | | | |
|---|---|---|---|
| 4,532,605 A | 7/1985 | Waller | |
| 5,471,572 A | 11/1995 | Buchner | |
| 5,590,250 A | 12/1996 | Lamping | |
| 5,666,475 A | 9/1997 | Salesin et al. | |
| 5,999,187 A | 12/1999 | Dehmlow et al. | |
| 6,002,406 A | 12/1999 | Zhao | |
| 6,034,661 A | 3/2000 | Servan-Scheiber | |
| 6,154,213 A * | 11/2000 | Rennison et al. | 715/854 |
| 6,184,894 B1 | 2/2001 | Rosman | |
| 6,204,850 B1 | 3/2001 | Green | |
| 6,204,857 B1 | 3/2001 | Piazza | |
| 6,348,921 B1 | 2/2002 | Zhao et al. | |
| 6,356,659 B1 | 3/2002 | Wiskott | |
| 6,360,029 B1 | 3/2002 | Moller | |
| 6,373,495 B1 | 4/2002 | Lin | |
| 6,392,661 B1 | 5/2002 | Tankersley | |
| 6,453,330 B1 | 9/2002 | Battle | |
| 6,476,829 B1 | 11/2002 | Smith | |
| 6,501,482 B1 | 12/2002 | Rosman | |
| 6,639,598 B2 | 10/2003 | Piazza | |
| 6,650,326 B1 * | 11/2003 | Huber et al. | 345/428 |
| 6,907,345 B2 | 6/2005 | Shipley | |
| 6,909,965 B1 | 6/2005 | Beesley | |
| 6,912,462 B2 | 6/2005 | Ogaki | |
| 6,927,782 B2 | 8/2005 | Coldefy | |

(Continued)

OTHER PUBLICATIONS

The Annotated VRML 97 Reference. 1999. http://accad.osu.edu/~pgerstma/class/vnv/resources/info/AnnotatedVrmlRef/ch1.htm.*

(Continued)

*Primary Examiner*—Ulka Chauhan
*Assistant Examiner*—Peter-Anthony Pappas
(74) *Attorney, Agent, or Firm*—Shook, Hardy & Bacon, L.L.P.

(57) ABSTRACT

A method of display of visual content is disclosed which utilizes nodes that launch only when necessary. The nodes may be rendered and/or displayed in the coordinate system of another node, perhaps a parent node, when appropriate. Increase precision of display objects is achieved.

17 Claims, 5 Drawing Sheets

U.S. PATENT DOCUMENTS

| | | | |
|---|---|---|---|
| 6,943,811 | B2 | 9/2005 | Matthews |
| 7,072,764 | B2 | 7/2006 | Donath |
| 2001/0030647 | A1 | 10/2001 | Sowizral et al. |
| 2002/0075311 | A1* | 6/2002 | Orbanes et al. ............. 345/764 |
| 2004/0128070 | A1 | 7/2004 | Schmidt et al. |

OTHER PUBLICATIONS

How to Read a United States National Grid (USNG) Spatial Address. 2000. http://www.xyproject.org/How%20To%20Read%20USNG/How%20to%20read%20USNG.htm.*

Reading Topographic Maps. Feb. 14, 2003. http://web.archive.org/web/20030214004603/http://www.map-reading.com/ch4-3.php.*

Mix-in class for patent figures, May 10, 2000; http://web.archive.org/20030510164335/http://openhealth.com/bw/doc/auto/Parent.html; 4 pages.

Hierarchical Data Structures; CS488/688: Introduction to Interactive Computer Graphics; University of Waterloo; Feb. 18, 2001; http://web.archive.org/web/20010218051725/http://medialab.di.unipi.it/web/IUM/Waterloo/node73.html.

Bill Overall, Foveated Image: Applications to Image and Video Compress, Mar. 12, 1999, http://scien.standord, edu/class/psych221/projects/99/wro.

Foley et al., Computer Graphics: Principles and Practice, Addison-Wesley Publishing Company Inc., 1997, p. 166-170.

Space Variant Imaging, Nov. 25, 2002, http://web.archive/org/web/20021125075827/http://www.svi.cps.utexas.edu/index.htm.

TDB-ACC-NO: NN 961137—Disclosure Title: Multidimensional Index Structure With Multi-Level Entry and Skip-Level Search for Partially-Specified Queries.—Publication-Data: IBM Technical Disclosure Bulletin, Nov. 1996, US.

* cited by examiner

SYSTEM AND METHOD FOR MULTIPLE NODE DISPLAY

RELATED APPLICATIONS

This application is a continuation of U.S. patent application Ser. No. 10/854,117, filed May 26, 2004, which claims the benefit of provisional application Ser. No. 60/474,313, filed May 30, 2003, the disclosures of which applications are hereby incorporated herein by reference in their entirety.

BACKGROUND OF THE INVENTION

The present invention relates to zooming user interfaces (ZUI) for computers.

Most present day graphical computer user interfaces are designed using visual components of a fixed spacial scale. The visual content can be manipulated by zooming in or out or otherwise navigating through it. However, the precision with which coordinates of various objects can be represented is extremely limited by the number of bits, usually between 16 and 64, designated to represent such coordinates. Because of their limited representational size, there is limited precision.

In the context of the zooming user interface, the user is easily able to zoom in, causing the area which previously covered only a single pixel to fill the entire display. Conversely, the user may zoom out, causing the contents of the entire display to shrink to the size of a single pixel. Since each zoom in or out may multiply or divide the xy coordinates by numerous orders of magnitude, just a few such zooms completely exhaust the precision available with a 64 bit floating point number, for example. Thereafter, round-off causes noticeable degradation of image quality.

It is an object of the present invention to provide a ZUI in which a larger range of zooms is possible.

It is a further object of the invention to provide a ZUI in which the precision in which coordinates are represented is related to the required precision needed at a particular zoom level of detail. It is a further object of the present invention to allow a pannable and zoomable two-dimensional space of a finite physical size, but of an arbitrarily high complexity or resolution, to be embedded into a well-defined area of a larger pannable and zoomable two-dimensional space.

A further objective of the present invention is to allow zooming out after a deep zoom-in to behave like the "back" button of a web browser, letting the user retrace his or her steps through a visual navigation.

A further objective of the present invention is to allow zooming in immediately after zooming out to behave analogously to the "forward" button of a web browser, letting the user precisely undo the effects of an arbitrarily long zoomout.

A further objective of the present invention is to allow a node, a visual object as defined more precisely below, to have a very large number of child nodes (for example, up to 10^28).

A further objective of the present invention is to allow a node to generate its own children programmatically on the fly, enabling content to be defined, created or modified dynamically during navigation.

A further objective of the present invention is to enable near-immediate viewing of arbitrarily complex visual content, even if this content is ultimately represented using a very large amount of data, and even if the data are stored at a remote location and shared over a low-bandwidth network.

A further objective of the present invention is to allow the user to zoom arbitrarily far in on visual content while maintaining interactive frame rates.

A further objective of the present invention is to allow the user to zoom arbitrarily far out to get an overview of complex visual content, in the process both preserving the overall appearance of the content and maintaining interactive frame rates.

These and other broader objectives of the present invention will become apparent to those skilled in the art from a review of the specification that follows.

SUMMARY OF THE INVENTION

The above and other objects of the present invention are accomplished by displaying visual content as plural "nodes." Each node preferably has its own coordinate system and rendering method, but may be contained within a parent node, and may be represented in the coordinate system and rendering method of the parent node. As a user navigates the visual content, by for example, zooming in or out, a node is only "launched" when the zooming results in an appropriate level of detail. The launching of the node causes the node to be represented in its own coordinate system and/or rendering method, rather than in the coordinate system and/or rendering method of a different node.

Prior to the node being launched, the node is either represented in the coordinate system of the parent node, or not represented at all. By launching nodes only when they are required, the precision of a coordinate system is a function of the zoom level of detail of what is being displayed. This allows a variable level of precision, up to and including the maximum permissable by the memory of the computer in which the system operates.

DESCRIPTION OF THE DRAWINGS

For the purposes of illustration, there are forms shown in the drawings that are presently preferred, it being understood, however, that the invention is not limited to the precise arrangements and instrumentalities shown.

DETAILED DESCRIPTION OF THE PREFERRED EMBODIMENTS

Figure 1:
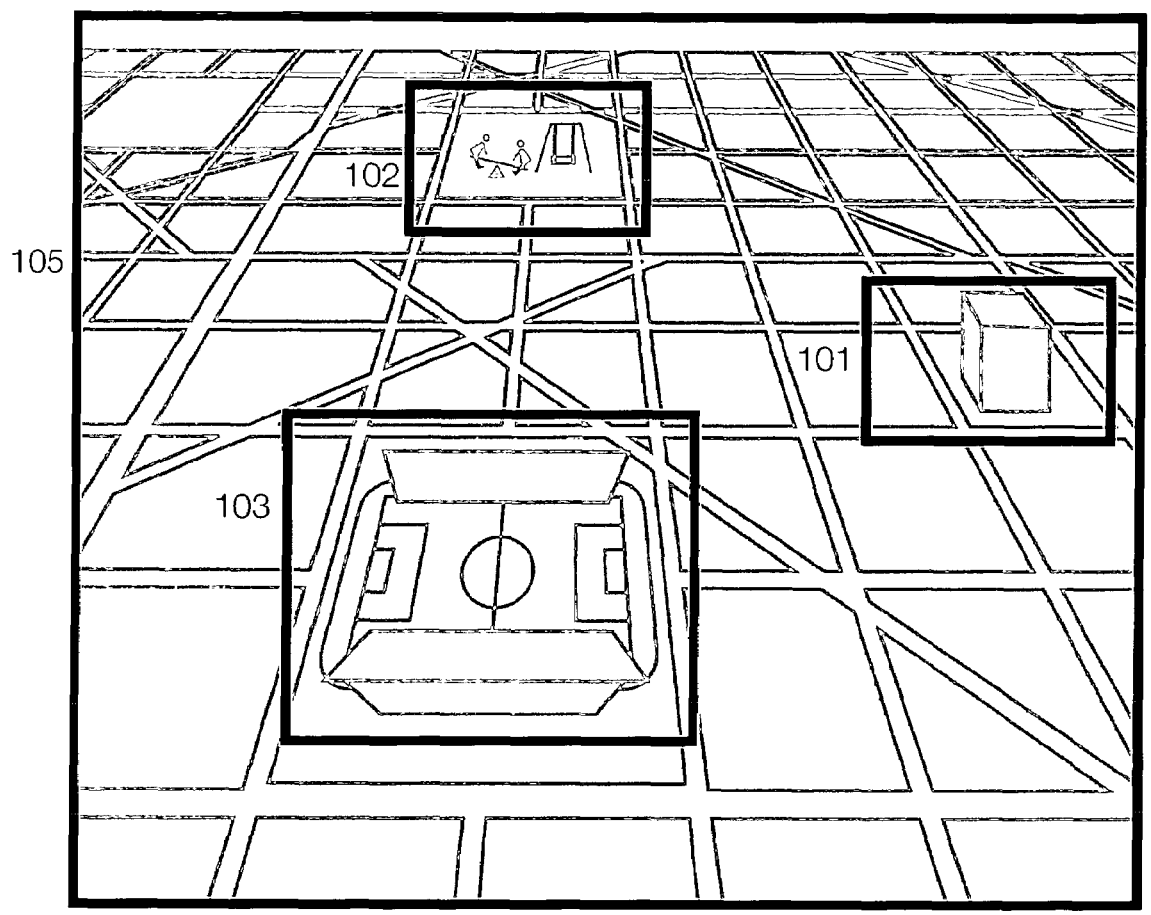
FIG. 1 is a depiction of visual content on a display.

We assume a user interface metaphor in which the display is a camera, through which the user can view part of a two-dimensional surface, or 2D universe. For convenience, although it is not necessary to do so, we ascribe physical dimensions to this universe, so that it may be, for example, one meter square. The invention is equally applicable to N-dimensional representations.

The exemplary universe in turn contains 2D objects, or nodes, which have a visual representation, and may also be dynamic or interactive (i.e. video clips, applications, editable text documents, CAD drawings, or still images). For a node to be visible it must be associated with a rendering method, which is able to draw it in whole or in part on some area of the display. Each node is also endowed with a local coordinate system of finite precision. For illustrative purposes, we assume a node is rectangular and represented by a local coordinate system.

These two parameters, the rendering method and coordinate system, specify how to display the node, and the positions of items in the node. Each node may have 0 or more child nodes, which are addressed by reference. The node need not, and generally does not, contain all the information of each child node, but instead only an address providing information necessary to obtain the child node. As a user navigates, for example, zooms in and out, the nodes are displayed on the screen, as shown, for example in FIG. 1.

Generally, a "node" is the basic unit of functionality in the present invention. Most nodes manifest visually on the user's display during navigation, and some nodes may also be animated and/or respond to user input. Nodes are hierarchical, in that a node may contain child nodes. The containing node is then called a parent node. When a parent node contains a child node, the child's visual manifestation is also contained within the parent's visual manifestation. Each node has a logical coordinate system, such that the entire extent of the node is contained within an exemplary rectangle defined in this logical coordinate system; e.g. a node may define a logical coordinate system such that it is contained in the rectangle (0,0)–(100,100).

Each node may have the following data defining its properties:
the node's logical coordinate system, including its logical size (100×100 in the above example);
the identities, positions and sizes of any child nodes, specified in the (parent) node's logical coordinates;
optionally, any necessary user data;
executable code defining these operations or "methods":
initialization of the node's data based on "construction arguments"
rendering all or a portion of the node's visual appearance (the output of this method is a rendered tile);
optionally, responding to user input, such as keyboard or mouse events.

The executable code defines a "node class", and may be shared among many "node instances". Node instances differ in their data content. Hence a node class might define the logic needed to render a JPEG image. The "construction arguments" given to the initialization code would then include the URL of the JPEG image to display. A node displaying a particular image would be an instance of the JPEG node class. Plural instances of a node may be viewable in the same visual content, similar to the way a software application may be instantiated numerous times simultaneously.

Note that in a complex visual document or application, it is usually possible to divide the necessary functionality into nodes in many different ways. For example, a scripted web-page-like document containing multiple images, pull-down menus and buttons could be implemented as a single node with complex rendering and user input methods. Alternatively, it could be implemented as a parent node which only defines the overall layout of the page, with every constituent image and button a child node. This has the obvious advantage of reusing or "factoring" the functionality more effectively: the buttons may all have the same behavior, and hence all be instances of the same node class; the images may all be in the same format and so also be instances of a common node class, etc. This also simplifies rearranging the layout—the parent node can easily move or resize the child nodes.

In accordance with the present invention, visual content may be displayed in a manner that depends upon the state of navigation input by a user. For example, FIG. 1 shows a node 105 which may be the image of a portion of the city. Node 105 may contain child nodes 101–103. Node 101 may be an image of a building in the city, node 102 could be an image of a playground, and node 103 might be a sports arena. At the level of zoom shown, nodes 101–103 are relatively small, so they can be represented as a small darkened area with no detail in node 105, located at the correct location in the coordinate system of node 105. Only the coordinate system and the rendering method of node 105 is needed.

Figure 2:
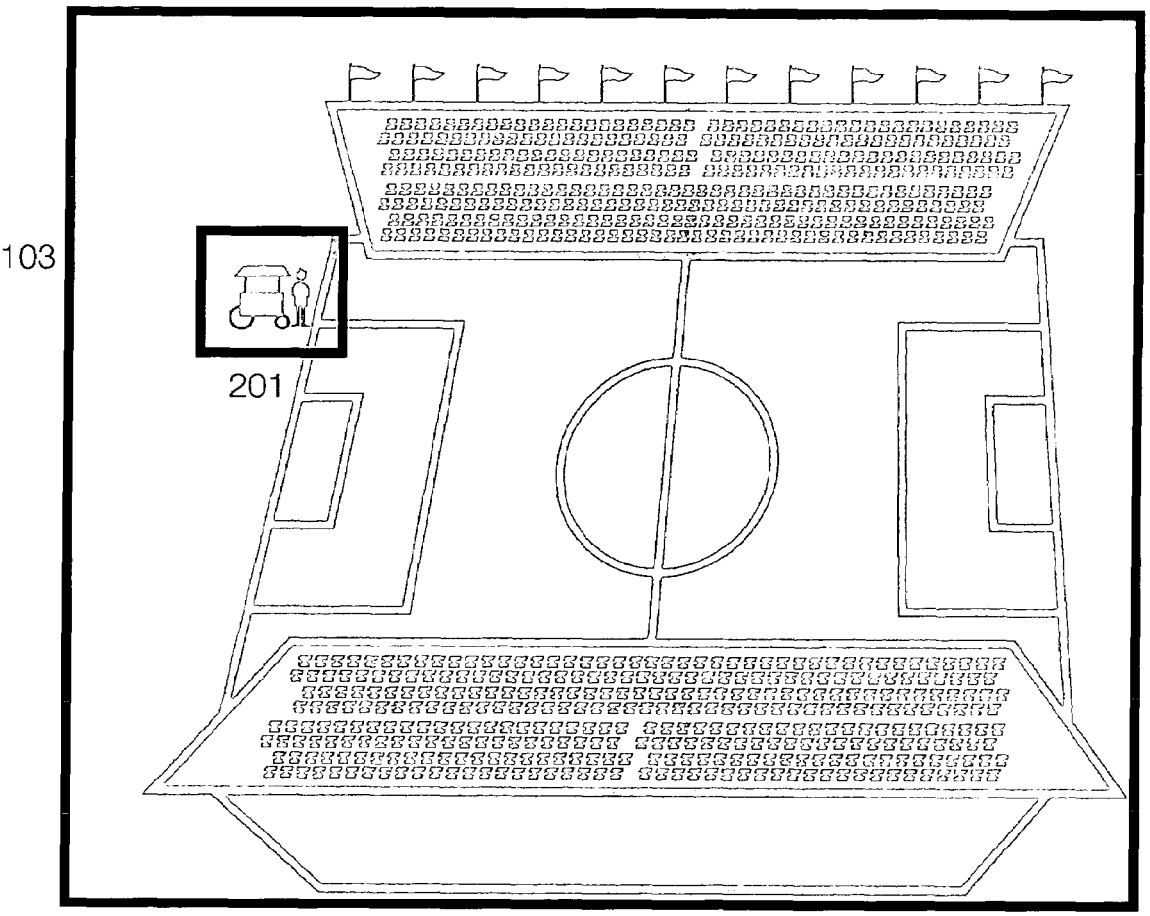
FIG. 2 is an image of the visual content of FIG. 1 at a different level of detail.

Consider the case where the user now zooms in so that a different level of detail (LOD) such as that shown in FIG. 2 results. In the LOD of FIG. 2, nodes 101 and 102 are no longer visible on the screen, due to the fact that the visual content is displayed as much larger. Additionally, it is noted that the because the size at which sports arena node 103 is displayed is now much larger, the details of the sports arena, such as the individual seats, the field, etc, now must be displayed.

In furtherance of the foregoing, sports arena node 103 would now be displayed not as a darkened area with no detail in the coordinate system of node 105, but rather, it would be "launched" to be displayed using its own coordinate system and rendering method. When displayed using its own coordinate system and rendering method, the details such as seating, the filed of play, etc. would be individually shown. Other functions discussed above, and associated with the node 103, would also begin executing at the point when node 103 is launched. The particular navigation condition that causes the launching of node 103, or any node for that matter, is a function of design choice and is not critical to the present invention.

The precision with which the node 103 will be displayed is the combined precision of the coordinate system utilized by node 105, as well as that of node 103. Thus, for example, if the coordinate system of each of said nodes utilizes 8 bits, then the combined precision will be 16 bits because the coordinate system of node 103 is only utilized to specify the position of items in node 103, but the overall location of node 103 within node 105 is specified within the coordinate system of node 105. Note that this nesting may continue repeatedly if sports arena 103 itself contains additional nodes within it. For example, one such node 201 may in fact be a particular concession stand within the sports arena. It is represented without much detail in the coordinate system and rendering method of node 103. As a user continues zooming in on sports arena 103, at some point node 201 will launch. If it is displayed using 8 bits of precision, those 8 bits will specify where within the node 201 coordinate system particular items are to be displayed. Yet, the location of node 201 within node 103 will be maintained to 8 bits of precision within the coordinate system of node 103, the location of which will in turn be maintained within the coordinate system of node 105 using 8 bits. Hence, items within node 201 will ultimately be displayed using 24 bits of precision.

By nesting nodes within nodes, the precision at which visual content may ultimately be displayed is limited only by the memory capacity of the computer. The ultimate precision with which visual content in a node is displayed after that node is launched is effectively the combined precision of all parent nodes and the precision of the node that has launched.

Hence, depending upon the level of nesting, the precision may increase as needed limited only by the storage capacity of the computer, which is almost always much more than sufficient. Additionally, the increased precision is only utilized when necessary, because if the image is at an LOD that does not require launching, then in accordance with the above description, it will only be displayed with the precision of the node within which it is contained if that node has been launched. Thus, for nodes nested within other nodes, as one moves from the outermost node inward, one may traverse nodes that have launched until finally reaching a node that has not launched yet. Any such unlaunched node, and nodes further within it, will be displayed only with the precision of the last traversed node that has launched.

This results in an "accordion" type precision, wherein the precision at which visual content is displayed expands and contracts as necessary and as dictated by the navigational input of the user, maximizing the efficiency of system resources by using them only when necessary for higher precision.

It is also noted, that when a node launches the display of that node changes from being based upon the coordinates and rendering method of the parent node to the coordinates and rendering method of the child node. That change is optimally made gradual through the use of blending, as described, for example, in copending U.S. patent application Ser. No. 10/790,253. However, other methodologies of gradually changing from the display of the information in the coordinate system and rendering method the parent node to the child node are possible. The system could be programmed, for example, that over a particular range, the blending from parent to child occurs. Then, as the user traverses through that range during a zoom, the changeover occurs, unless the navigation is ceased during that range, in which case the blending may continue until fully displayed in the appropriate coordinate system.

An additional issue solved by the present invention relates to a system for maintaining the spatial interrelationship among all nodes during display. More particularly, during dynamic navigation such as zooming and panning, many different coordinate systems are being used to display potentially different nodes. Some nodes, as explained above, are being displayed merely as an image in the coordinate system of other nodes, and some are being displayed in their own coordinate systems. Indeed, the entire visual display may be populated with nodes displayed at different positions in different coordinate systems, and the coordinate systems and precisions used for the various nodes may vary during navigation as nodes are launched. Hence, it is important to ensure that the nodes are properly located with respect to each other, because each node is only knowledgeable of its own coordinate system. The present invention provides a technique for propagating relative location information among all of the nodes and for updating that information when needed so that each node will "know" the proper position in the overall view at which it should render itself.

The foregoing may be accomplished with the addition of a field to the node structure and an additional address stack data structure. The expanded node definition includes a field which we term the "view" field, and which is used by the node to locate itself relative to the entire display. The view field represents, in the coordinates of that node, the visible area of the node—that is, the image of the display rectangle in the node's coordinates. This rectangle may only partially overlap the node's area, as when the node is partially off-screen. Clearly the view field cannot always be kept updated for every node, as we cannot necessarily traverse the entire directed graph of nodes in real time as navigation occurs.

Figure 3:
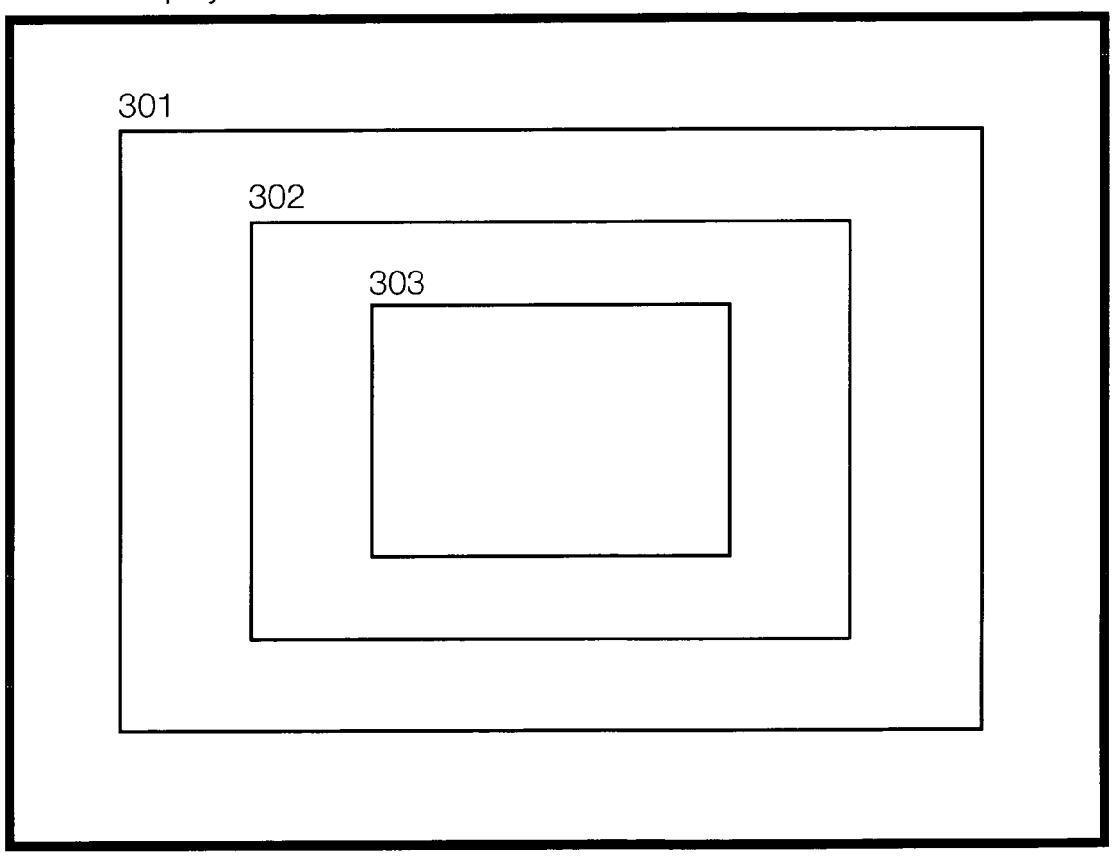
FIG. 3 is a representation of an embodiment of the invention.

The stack structure is defined thus:
Stack<Address>viewstack;
where this stack is a global variable of the client (the computer connected to the display). For exemplary purposes we assume that navigation begins with an overview of a universe of content, defined by a root node; then this root node is pushed onto the viewStack, and the root node's view field might be initialized to be the entire area of the root node, i.e.
rootNode.view=rootNode.coordSystem;
Push(viewStack, rootNode);

Schematically, the viewStack will specify the addresses of a sequence of nodes "pierced" by a point relative to the display, which we will take in our exemplary implementation to be the center of the display. This sequence must begin with the root node, but may be infinite, and therefore must be truncated. In an exemplary embodiment, the sequence is truncated when the nodes "pierced" become smaller than some minimum size, defined as minimumArea. The current view is then represented by the view fields of all of the nodes in the viewStack, each of which specify the current view in terms of the node's local coordinate system. If a user has zoomed very deeply into a universe, then the detailed location of the display will be given most precisely by the view field of the last node in the stack. The last element's view field does not, however, specify the user's viewpoint relative to the entire universe, but only relative to its local coordinates. The view field of the root node, on the other hand, does specify where in the universe the user is looking. Nodes closer to the "fine end" of the viewStack thus specify the view position with increasing precision, but relative to progressively smaller areas in the universe. This is shown conceptually in FIG. 3, where it can be seen that of the three nodes 301, 302, and 303 that have been launched, node 303 provides the most accurate indication of where the user is looking, since its coordinate system is the "finest", but node 301 provides information, albeit not as fine, on a much larger area of the visual content.

The problem then reduces to the following: the views (i.e. view fields) of all visible nodes must be kept synchronized as the user navigates through the universe, panning and zooming. Failure to keep them synchronized would result in the appearance of nodes moving on the display independently of each other, rather than behaving as a cohesive and physically consistent 2D surface.

Changing the view during any navigation operation proceeds as follows. Because the last node in the viewStack has the most precise representation of the view, the first step is to alter the view field of this last node; this altered view is taken to be the correct new view, and any other visible nodes must follow along. The second step is to propagate the new view "upward" toward the root node, which entails making progressively smaller and smaller changes to the view fields of nodes earlier in the stack. If the user is deeply zoomed, then at some point in the upward propagation the alteration to the view may be so small that it ceases to be accurately representable; upward propagation stops at this node. At each stage of the upward propagation, the change is also propagated downward to other visible nodes. Hence, first, the last node's parent's view is modified; then, in the downward propagation, the last node's "siblings". The next upward propagation modified the grandparent's view, and the second downward propagation modifies first uncles, then first cousins. The downward propagation is halted, as before, when the areas of "cousin nodes" become smaller than minimumArea, or when a node falls entirely offscreen.

Figure 4:
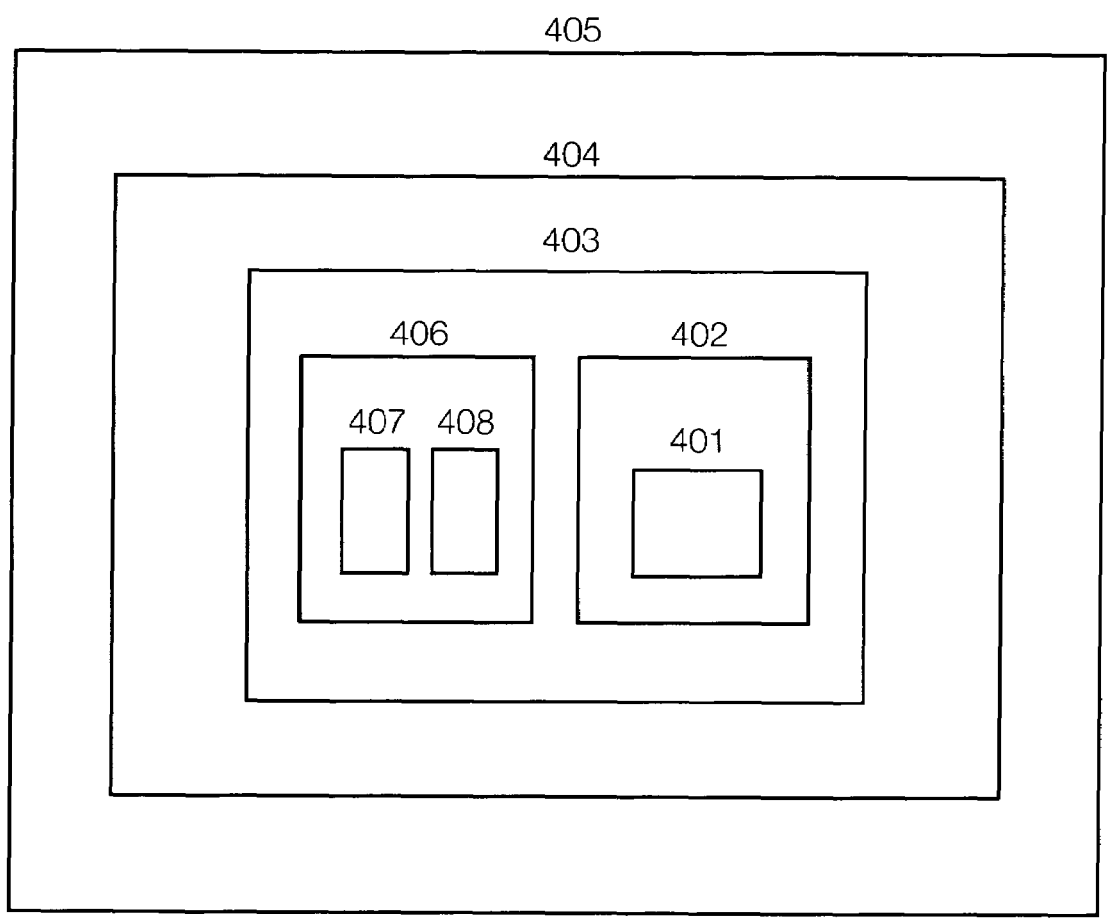
FIG. 4 is an exemplary embodiment of the invention showing plural nodes on a display.
Figure 5:
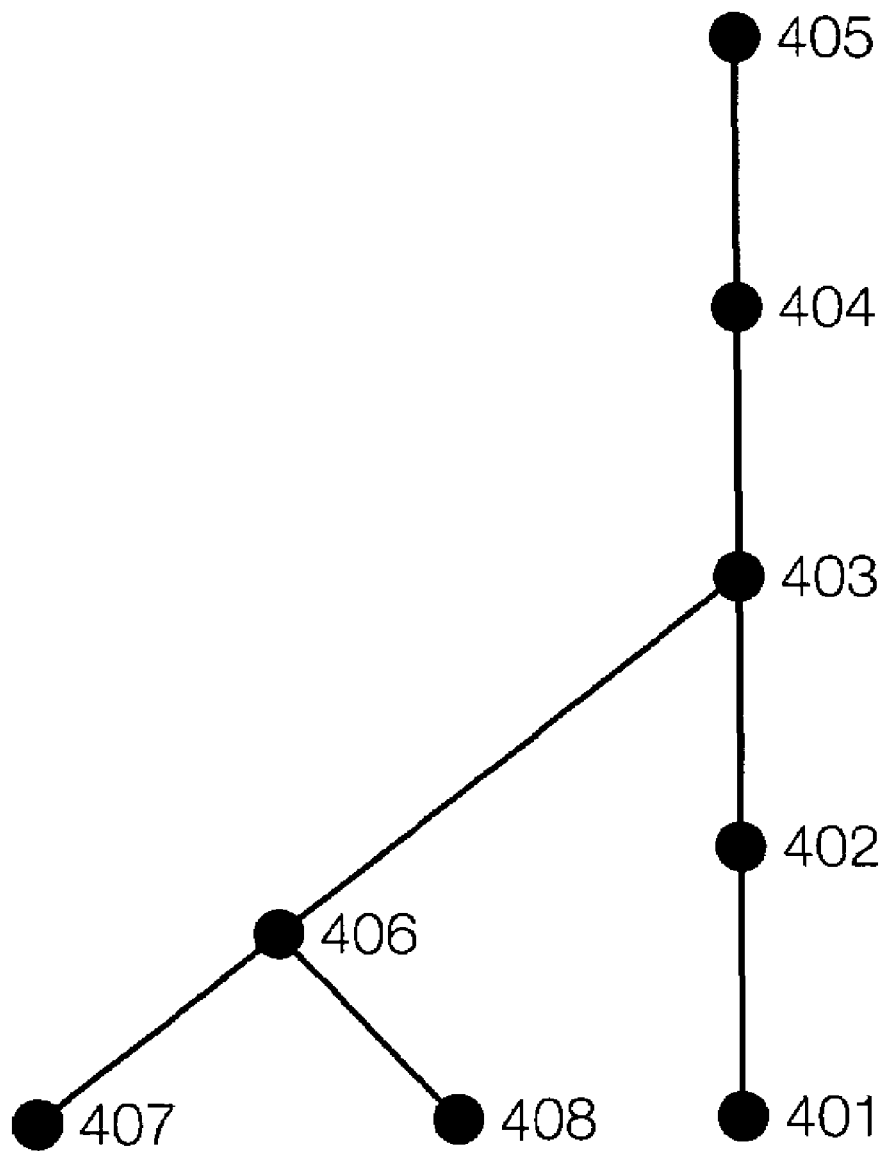
FIG. 5 is a tree diagram corresponding to the exemplary embodiment shown in FIG. 4.

The foregoing technique involves translating the layout of the various nodes into a tree, which conceptually is illustrated in FIGS. 4 and 5. As can be seen from FIGS. 4 and 5, there is a corresponding tree for a particular displayed set of nodes, and the tree structure may be used to propagate the view information as previously described. Each of the nodes 401 through 408 in FIG. 4 corresponds to a point on the tree having a similar reference number in FIG. 5.

A panning operation may move the last node far enough away that it no longer belongs in the viewStack. Alternatively, zooming in might enlarge a child to the extent that a lengthening of the viewStack is required, or zooming out might bring the last node's area below a minimum area requiring a truncation of the viewStack. In all of these cases the identity of the last node changes. These situations are detected during the downward propagation, which may alter the viewStack accordingly, potentially leaving it longer or shorter.

One simple case of the foregoing is that during zooming, a node gets launched so that now it needs to be placed in the view stack. Another example is that by zooming out, a previously visible node becomes so small that it must be removed from the viewstack.

An extension of the idea is to avoid truncating the viewStack immediately in response to a long outward zoom. Truncating the viewStack is only necessary if the user then pans. Although a long outward zoom will cause the view fields of deeply zoomed nodes to grow very large (and therefore numerically inaccurate), a field Point2D viewCenter;

can be added to the Node structure, representing the central point of the view rectangle; zooming without panning therefore does not alter the viewCenter field of any node. This construction allows zooming far outward to be followed immediately by zooming back in. Because the viewStack has been left intact, the user can then return to precisely the starting view. This behavior is analogous to the "back" and "forward" buttons of a web browser: "back" is analogous to zooming out, and "forward" is analogous to zooming back in. In a web browser, if a user uses "back" to return to a previous web page, but then follows an alternate link, it is at this point that "forward" ceases to work. Following an alternate link is thus analogous to panning after zooming out.

The foregoing provides that visual content may be displayed and navigated in a variety of fashions with substantially infinite precision, limited only by the capacity of the computer system on which the application is running. The visual content displayed at any given time is then displayed as an assembly of nodes, wherein only the nodes needed for the particular view have been launched, and all other nodes are displayed without launching as part of another node or not at all. It is understood that various other embodiments will be apparent to those of ordinary skill in the art, and that the invention is not limited to the embodiments described herein.

The invention claimed is:

1. A method of displaying visual content, said visual content comprising at least two nodes, the method comprising:
    displaying the visual content of at least a first node and at least a second node, wherein the first node contains information indicative of a rendering method and coordinate system of the first node and the second node contains information indicative of a rendering method and coordinate system of the second node, wherein the rendering method and coordinate system of the first node differs from the rendering method and coordinate system of the second node, and wherein the visual content associated with the first node and the second node are displayed in the coordinate system of the first node and using the rendering method of the first node until a predetermined navigation condition is detected; and
    displaying the visual content of the second node in the coordinate system of the second node and using the rendering method of the second node when the predetermined navigation condition is detected.

2. The method of claim 1, wherein said predetermined navigation condition is a size of display of said second node.

3. The method of claim 1 wherein said second node is within said first node.

4. The method of claim 1 wherein said first node contains a pointer to said second node.

5. The method of claim 1 wherein said second coordinate system is more precise than said first coordinate system.

6. The method of claim 5 wherein a precision associated with a coordinate system is measured in number of digits, and wherein said number of digits is variable.

7. The method of claim 6 wherein said precision associated varies up to a maximum limited by storage capacity of a computer on which said method is operating.

8. A method of displaying visual content, said method comprising:
    displaying visual content of a first node in a coordinate system of a second node and using a rendering method of the second node during a first range of zooms, wherein the first node contains information indicative of a coordinate system and rendering method of the first node, the second node contains information indicative of the coordinate system and rendering method of the second node, and the coordinate system and rendering method of the first node differs from the coordinate system and rendering method of the second node;
    displaying said visual content of said first node in the coordinate system of the first node and using the rendering method of the first node during a second range of zooms; and
    ceasing to display said visual content associated with said first node during a third range of zooms.

9. The method of claim 8 wherein said visual content gradually blends at borders of said first and second range of zooms, and said second and third range of zooms.

10. The method of claim 9 wherein at the border of the first and second range of zooms, said visual content is displayed by blending from a first rendition to a second rendition.

11. The method of claim 10 wherein said first rendition and second rendition use different coordinate systems.

12. The method of claim 10 wherein said first rendition and said second rendition use different rendering methods.

13. The method of claim 10 wherein said first and second renditions use different rendering methods and different coordinate systems.

14. A method of displaying nodes comprising displaying a first node in a first coordinate system, and displaying the first node in a second coordinate system by gradually blending from said first coordinate system to said second coordinate system during a predefined range of navigation, wherein a rendering method used for said first node also gradually changes from a first such rendering method to a second rendering method, wherein the first node contains information indicative of the first coordinate system and first rendering method, and wherein a second node contains information indicative of the second coordinate system and second rendering method, and wherein the first coordinate system and first rendering method differ from the second coordinate system and second rendering method.

15. The method of claim 14, wherein said navigation comprises either zooming or panning.

16. The method of claim 15 wherein information about a view is propagated among plural nodes as said navigation occurs.

17. The method of claim 16 wherein said propagation is accomplished using a mathematical tree.

* * * * *